Figure 1:
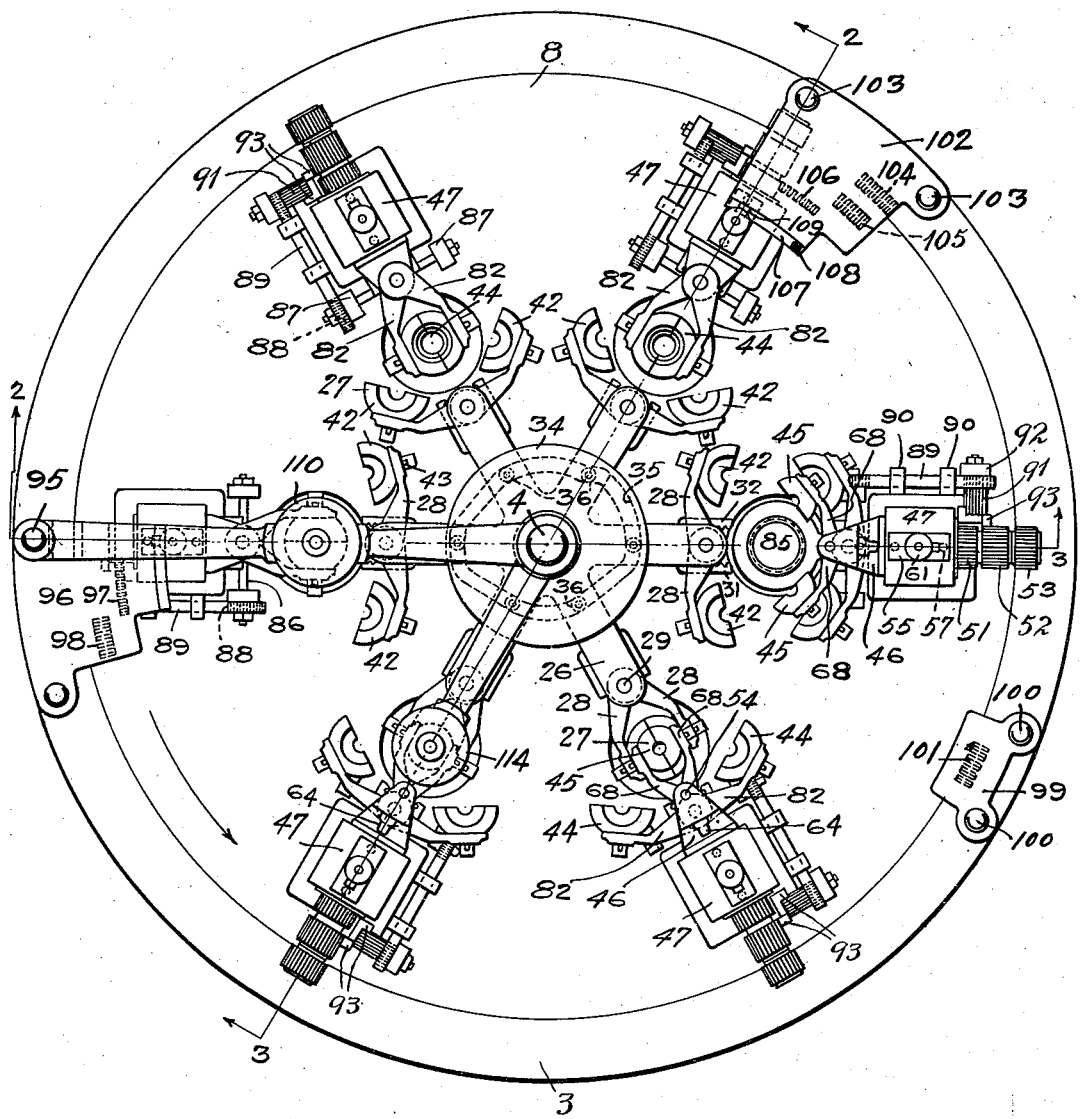

L. W. PROEGER.
APPARATUS FOR MAKING GLASS ARTICLES.
APPLICATION FILED JUNE 17, 1911.

1,188,559.

Patented June 27, 1916.
5 SHEETS—SHEET 1.

WITNESSES.
J. R. Keller
John F. Will

INVENTOR.
Louis W. Proeger
By Kay attys

L. W. PROEGER.
APPARATUS FOR MAKING GLASS ARTICLES.
APPLICATION FILED JUNE 17, 1911.
1,188,559.
Patented June 27, 1916.
5 SHEETS—SHEET 2.
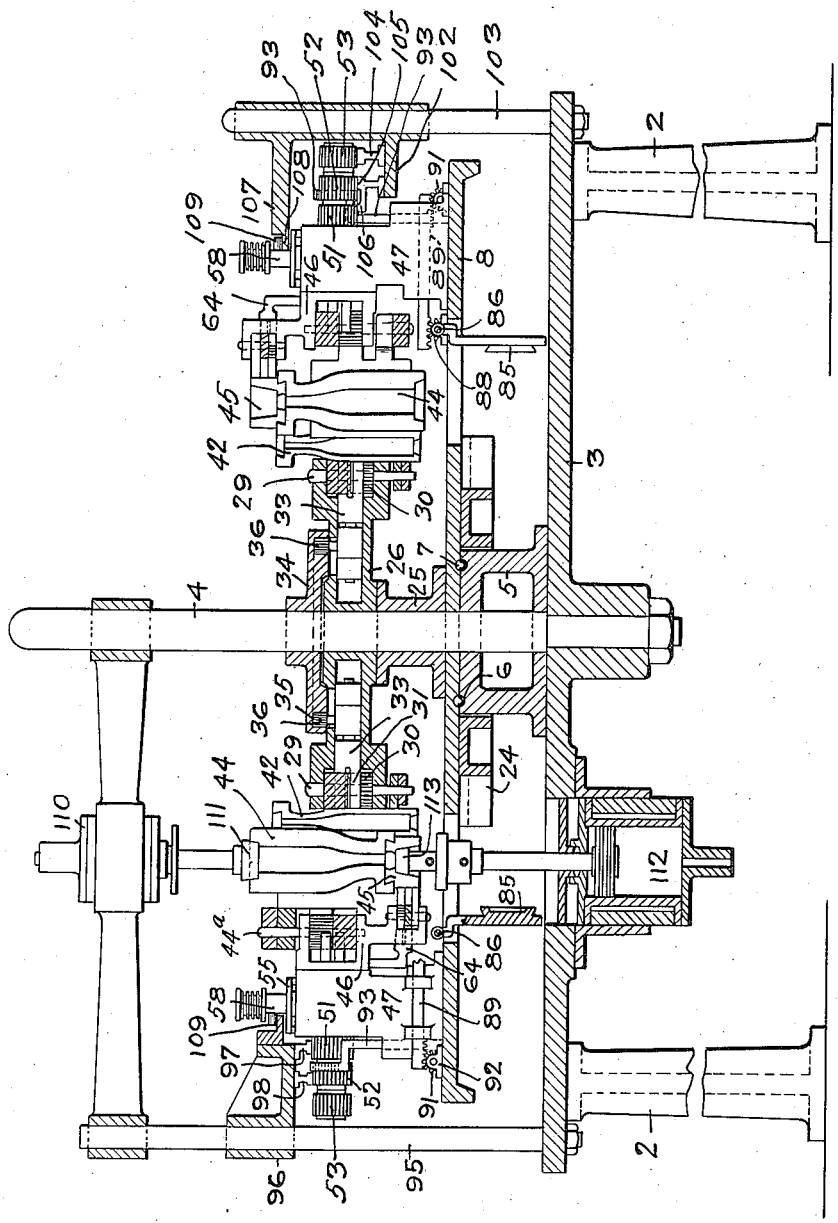
WITNESSES.
J. R. Keller
John F. Will
INVENTOR.
Louis W. Proeger
By Kay Totten
attys

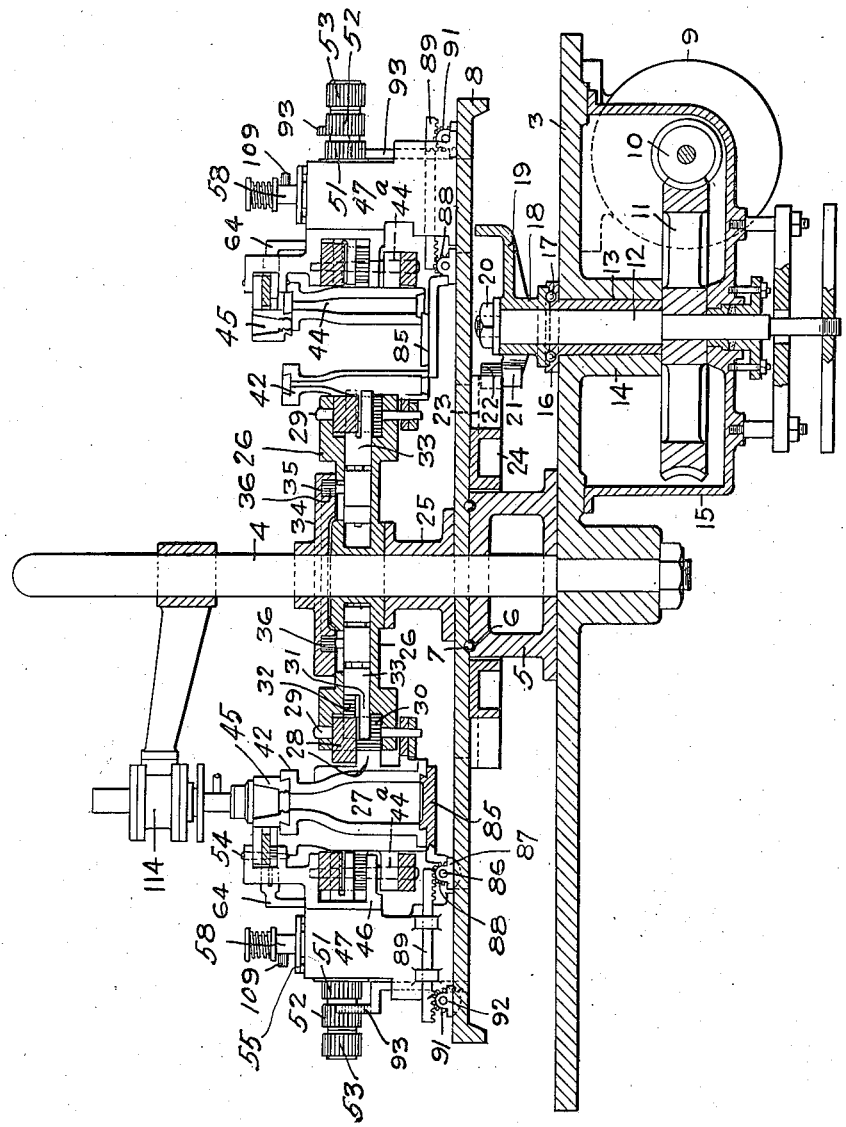

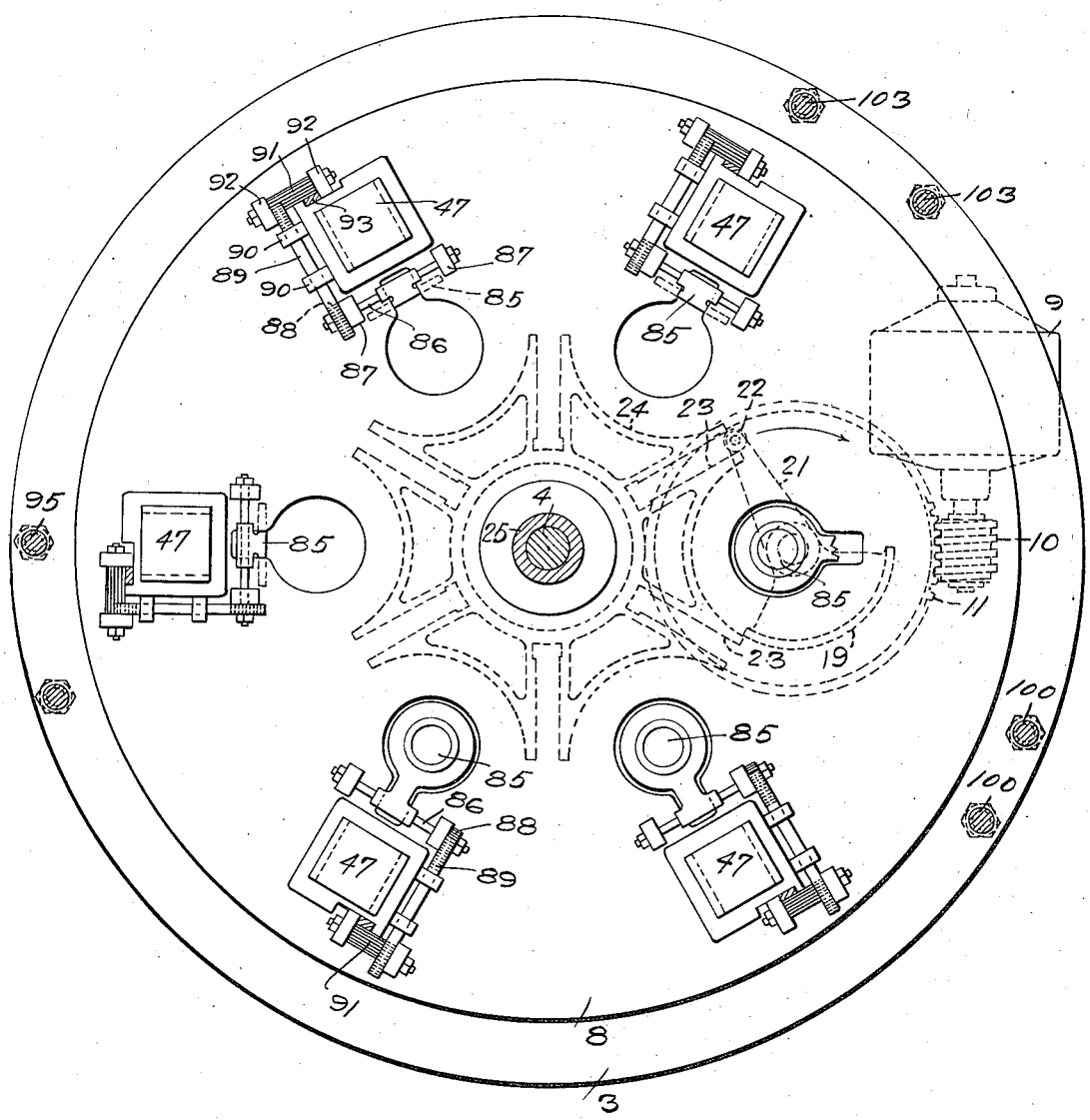

L. W. PROEGER.
APPARATUS FOR MAKING GLASS ARTICLES.
APPLICATION FILED JUNE 17, 1911.
1,188,559. Patented June 27, 1916.
5 SHEETS—SHEET 5.
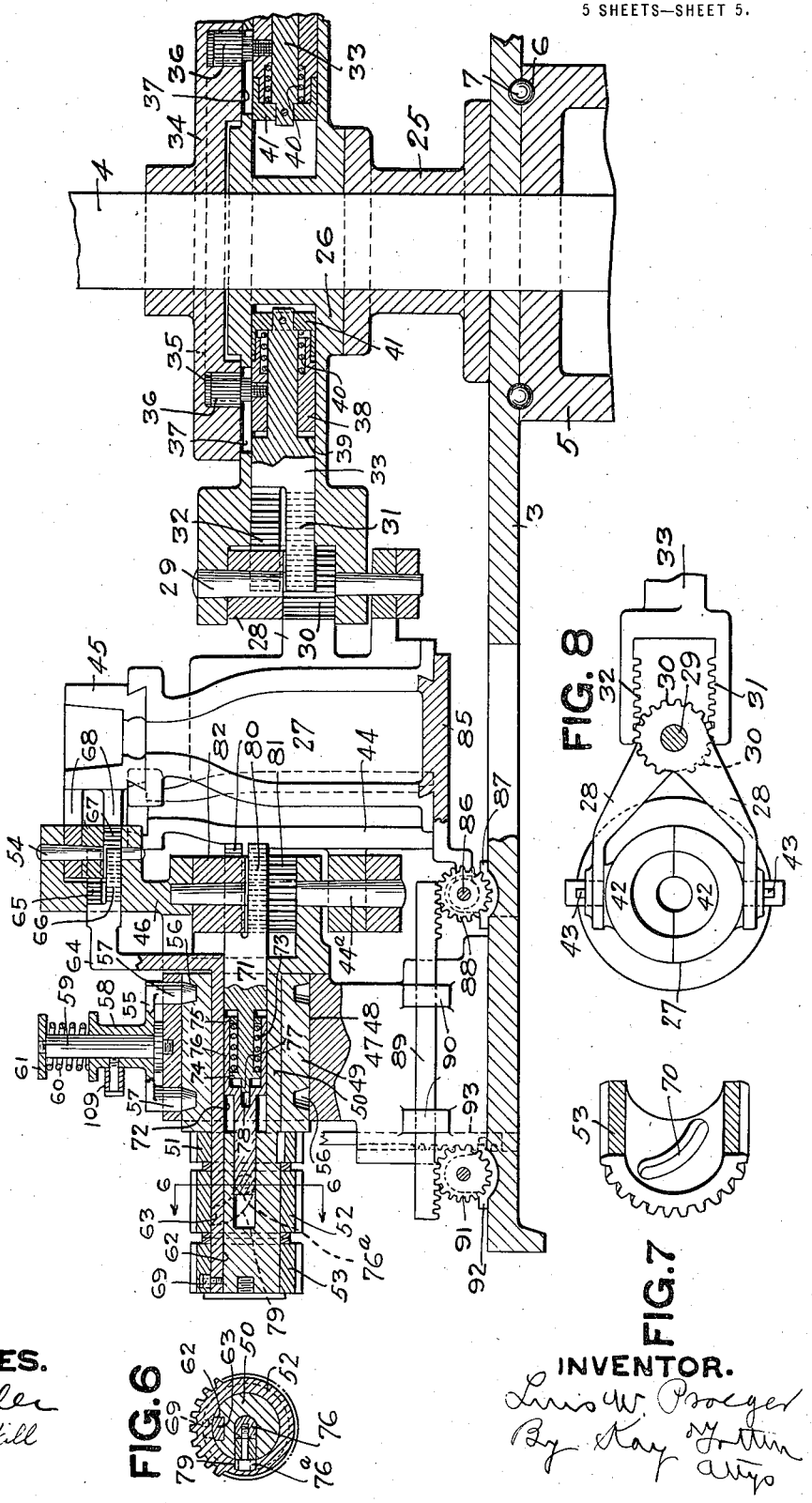
WITNESSES.
J. R. Keller
John F. Will
INVENTOR.
Lewis W. Proeger
By Kay Totten
Attys

UNITED STATES PATENT OFFICE.

LUIS W. PROEGER, OF PITTSBURGH, PENNSYLVANIA, ASSIGNOR OF ONE-HALF TO CHARLES N. BRADY, OF WASHINGTON, PENNSYLVANIA.

APPARATUS FOR MAKING GLASS ARTICLES.

1,188,559.     Specification of Letters Patent.     Patented June 27, 1916.

Application filed June 17, 1911. Serial No. 633,879.

*To all whom it may concern:*

Be it known that I, LUIS W. PROEGER, a citizen of the United States, and resident of Pittsburgh, in the county of Allegheny and State of Pennsylvania, have invented a new and useful Improvement in Apparatus for Making Glass Articles; and I do hereby declare the following to be a full, clear, and exact description thereof.

My invention relates to apparatus for forming hollow glass articles, such as bottles, etc.

The object of my invention is to provide a simple form of apparatus in which the bottles or other articles may be formed in quick succession, and in which the blank-mold and blow-mold are arranged on the same or substantially the same horizontal plane, so that the construction of the machine is simplified and the transfer of the blank to the blow-mold may be done without the necessity of bringing the blank from a higher to a lower level in which transfer it is liable to become chilled.

To these ends my invention comprises the novel features hereinafter set forth and claimed.

In the accompanying drawings Figure 1 is a plan view of my improved apparatus; Fig. 2 is a section on the line 2—2 Fig. 1; Fig. 3 is a section on the line 3—3 Fig. 1; Fig. 4 is a bottom plan view of the table with molds removed and Fig. 5 is an enlarged sectional view showing the means for opening and closing the molds, the star wheel being omitted; Fig. 6 is a section on the line 6—6 Fig. 5; and Figs. 7 and 8 are details.

Referring to the drawings, the numeral 2 designates suitable standards upon which the bed-plate 3 is supported. This bed-plate has the vertical shaft 4 supported thereon. The casting 5 engages the shaft 4 and rests upon the plate 3 and in said casting is formed the ball-race 6 for the balls 7 of the ball-bearing for the rotary table 8. An intermittent rotary movement is imparted to the table 8 in the following manner: A suitable motor 9 is supported by the bed-plate 3 and the worm 10 driven by said motor engages the worm-wheel 11 which is mounted on the shaft 12. This shaft 12 passes up through the sleeve 13 in the hub-portion 14 of the plate. These parts are inclosed by the casing 15. The sleeve 13 has the flange 16 with the ball-bearing 17 which is engaged by the hub-portion 18 of the segment 19 which is secured by the jamb nut 20 to the shaft 12. The segment 19 carries the arm 21 which has the roller 22 at its outer end adapted to engage the slots or recesses 23 in the star-wheel 24 secured to the table 8, whereby an intermittent movement is imparted to the table 8 by the engagement of the arm 21, while the segment 19 engaging the spaces intermediate the points of the star-wheel acts to lock the star-wheel against movement when not engaged by the arm 21.

A sleeve 25 surrounds the vertical shaft 4 and is secured to the table 8. A spider 26 is carried on the sleeve 25 and is secured thereto so as to rotate with the table 8. The spider 26 carries at its extremities the blow-molds 27. These blow mold devices are composed of the swinging arms 28 which are mounted on the pin 29. The arms 28 have the toothed portions 30 which are engaged by the racks 31 and 32 at different levels to engage the toothed portions 30 of arms of the blow-mold which are arranged one above the other. The racks 31 and 32 form part of the arm 33 which is adapted to move back and forth in the spider-arm. This movement is imparted to the arm 33 by means of the stationary cam 34 on the shaft 4, said cam having the cam-way 35 which engages the projection 36 which passes through the slot 37 in the spider-arm. This projection 36 is screwed into the sleeve 38 which is adapted to engage the shoulder 39 on the arm 33 when the cam operates to open the mold as fully hereinafter set forth. A spring 40 is interposed between the sleeve 38 and a collar 41 on the end of the arm 33, said spring acting to insure the tight closing of the mold as fully hereinafter set forth. The blow-mold halves 42 are secured to the arms 28 by the keys 43 and in this way different sized blow-molds may be attached to said arms.

The blank-molds 44 together with the neck-molds 45 are arranged to be rotated and to provide for this rotation of the blank and neck-molds I employ the following construction: The halves of the blank-molds are adapted to swing on the pin 44ª connecting the same and are secured by said pin to the vertically rotary frame 46. This rotary frame 46 is carried by the support 47 on the table 8. The support 47 has the bore 48 containing the sleeve 49 and keyed within said sleeve and adapted to turn therewith is the shaft-portion 50 of the frame 46. Keyed to the shaft portion 50 is the pinion 51. Loosely mounted on the shaft portion 50 are the pinions 52 and 53. The neck-mold 45 has the hinged pin 54 which also connects said neck-mold to the frame 46. In order to lock the sleeve 49 as well as the shaft-portion 50 of the frame 46 against accidental rotary movement, I provide the lock 55 which is adapted to engage the recesses 56 in the sleeve 49. This lock 55 is mounted on the support 47 and comprises the latches 57 which are connected to the sleeve 58 on the bolt 59 screwed into the support 47. A spring 60 is interposed between the sleeve 58 and the head 61 on the bolt 59 so as to normally force the latches into engagement with the recesses 56 of the sleeve 49. A groove 62 is formed in the shaft-portion 50 and within said groove is the rod 63 which has the upwardly extending portion 64. Projecting out from the extension 64 are the racks 65 and 66 arranged at different levels and adapted to engage the toothed portions 67 on the arms 68 of the neck-mold 45. The rod 63 is slidable back and forth in the groove 62 and this is accomplished by the stud 69 on said rod engaged by the groove 70 in the pinion 53, which is loosely mounted on the shaft portion 50. This groove 70 is clearly indicated in Fig. 7. To provide for the opening and closing of the blank-mold I employ the rod 71 which is slidable in the passage 72 formed in the shaft-portion 50. The spring 73 surrounds the rod 72 and said spring is interposed between a collar 74 on said rod and a shoulder 75 on a slidable member 76. The rod 71 has the tail-piece 77 which engages a recess 78 in the slidable member 76. The member 76 has a roller 76ª which is engaged by the groove 79 on the inner face of the pinion 52. At the outer end of the rod 71 are the racks 80 which engage the toothed portions 81 on the arms 82 of the blank-mold 44.

The bottom plates 85 for the blow-molds are adapted to be thrown up into position to close the bottom of the blow molds just before the blowing operation, and this movement of the bottom plates is accomplished in the following manner: The bottom plate 85 is secured to the rock-shaft 86 which is mounted in bearings 87. This rock-shaft 86 carries the pinion 88 which is engaged by the rack-bar 89 slidable in guides 90. An elongated pinion 91 is mounted in bearings 92 and engages the other end of the rack-bar 89. A vertical rack-bar 93 also engages the elongated pinion 91 and the upper end of said rack-bar is off-set and engaged by the pinion 52 as clearly indicated in Fig. 2. From this it will be apparent that when the pinion 52 is rotated the vertical movement will be imparted to the rack-bar 93 and through said rack-bar rotary motion imparted to the elongated pinion 91. Motion is transmitted from this pinion 91 to the rack-bar 89 and through said rack-bar to the pinion 88 on the rock-shaft 86, which will rock said shaft and raise or lower the bottom-plate 85. Secured to the upright 95 is the rack-plate 96 having the racks 97 and 98 which are in the path of and adapted to be engaged by the pinions 51 and 52 as the table 8 rotates. Another rack-plate 99 is carried by the uprights 100 and the rack 101 secured to the upper face of said plate is in the path of and adapted to be engaged by the pinion 53. Still another rack-plate 102 is carried by the uprights 103 and said rack-plate has the three racks 104, 105, 106, supported thereon and in the path of the pinions 51, 52 and 53. A cam-plate 107 is also carried by the uprights 103 and said cam-plate extends over the rack-plate 102 as indicated in Fig. 2. This cam-plate has the cam 108 which is engaged by the roller 109 on the sleeve 58 so as to raise said sleeve to release the locking device 55 and permit of the rotation of the blank and neck-mold as fully hereinafter set forth. Supported by the standard 95 and the central shaft 4 is the cylinder 110 which operates the closure 111 for closing the blank-mold and for admitting air pressure to force the glass down around the neck-mold in the ordinary manner. A cylinder 112 is carried by the bed-plate 3 and said cylinder operates the closure 113 which enters the opening in the neck-mold to form the neck in the ordinary manner.

The operation of my improved apparatus in the forming of a bottle or like article is as follows: In Fig. 1 at the position marked "charging" the molten glass is introduced into the blank-mold 44 which is in its closed position while its corresponding blow-mold 27 is open. The blank-mold in the charging position is inverted, and the neck-mold 45 is closed. The glass is introduced in any suitable manner and as soon as the mold has been charged the table 8 is moved by the motor around to the next position which is the point at which the blank is formed, the table moving in the direction indicated by the arrow Fig. 1. In this position the cylinders 110 and 112 are operated to bring the closures 111 and 113 into position for the admission of air into the blank-mold and the neck-mold as indicated in Fig. 2. When the blank has been formed in this manner the table 8 again advances and in doing so the rack 97 is engaged by the pinion 51 which is rotated thereby and the shaft portion of the frame 46 is rotated and the blank-mold together with the neck-mold are rotated to invert the blank and neck-mold so that the neck-mold is above and the blank-mold below, instead of in the position shown in Fig. 2. When this has been accomplished the pinion 52 comes into engagement with the rack 98 and said pinion is rotated with two results, first, the movable member 76 is moved outwardly and with it the rod 71 engaged by said movable member, so that the racks 80 moving over the toothed portions 81 of the arms of the blank-mold will act to open the blank-mold. Second, the rotation of the pinion 52 will move the rack-bar 93 and through the connections above described the rock-shaft 86 is moved to bring the bottom-plate 85 up into a horizontal position. The neck-mold, however, remains closed and the blank is suspended therefrom. The table continues to move with the blank-mold opened and the bottom plate 85 raised. Just before the third position of rest is reached, the cam 34 acting on the projection 35 operates the racks 31 and 32 and moves the arms 28 of the blow-mold so as to close the blow-mold around the blank, the neck-mold and bottom plate 85 coöperating with the halves of the blow-mold to form the complete mold. The blowing operation takes place at this point as indicated in Fig. 3 where the air passes from blowing cylinder 114 to the mold, and the bottle is finished. The table as it continues to rotate comes around in 8 as it continues to rotate comes around in position where the pinion 53 engages the rack 101. This acts to move the rod 63 by the engagement of the projection 69 with the groove 70 in the pinion 53 and the racks 65 and 66 are operated to open the neck-mold 45, while the cam 34 acts to open the blow-mold leaving the bottle supported by the bottom plate 85. At this point the finished bottle is removed and on the next movement of the table 8 the pinion 53 engages the rack 104 which closes the neck-mold and practically simultaneously therewith the pinion 52 engages the rack 105. This acts to close the blank-mold and at the same time lowers the bottom plate 85. The next step in the operation is the engagement of the pinion 51 with the rack 106 which results in the turning of the blank-mold and neck-mold into their inverted or charging position, so that when the next stop of the table takes place the charging of the mold is again effected. Just prior to the turning of the blank-mold and neck-mold as above, the roller 109 on the sleeve 58 engages the cam 108 and the locking device 55 is released so as to permit of the rotation of the blank and neck-mold.

By having the blank-molds and blow-molds in the same or substantially the same horizontal plane or at the same level I greatly simplify the construction as well as the operation in that the blank does not have to be lowered into position to be surrounded by the blow mold, and that there is not the same liability of the undue elongation of the blank due to the lowering of it from a higher level to the blow-mold below. There is furthermore greater accessibility to the parts for repairs, renewals, etc.

What I claim is:

1. In apparatus for forming glass articles, the combination of a rotary support, a mold carried thereby, a rack, a pinion carried by said support adapted to engage said rack, a movable member engaged by said pinion to be moved to and fro thereby, a second movable member engaged by said first movable member to be moved thereby, a spring interposed between said members, racks carried by said second named member and toothed portions on the mold halves engaged by said racks.

2. In apparatus for forming glass articles, the combination of a rotary support a mold carried thereby, a rack, a pinion carried by said support adapted to engage said rack, a movable member, said pinion having a cam groove engaging said movable member to move said member back and forth by the rotation of said pinion, and connections between said movable member and the mold halves to open and close the same.

3. In apparatus for forming glass articles, the combination of a rotary support, a mold carried thereby, a neck-mold in coöperative position with reference to said mold, racks, pinions on said rotary support adapted to engage said racks, connections between one of said pinions and said mold to open and close the mold-halves, and connections between the other pinion and the neck-mold for opening and closing said neck-mold.

4. In apparatus for forming glass articles, the combination of a horizontally rotary support, a vertically rotary support carried thereby, a mold carried by said last named support, a shaft portion on said vertically rotatable support, a pinion keyed to said shaft portion, a pinion loosely mounted on said shaft portion, connections between said loosely mounted pinion and said mold to open and close same; a neck-mold carried by said vertically rotary support, a longitudinally movable rod, connections between said rod and said neck-mold to open and close the same, a third pinion on said shaft portion, connections between said third pinion and said rod for moving the same longitudinally, and racks in the paths of said pinions to be engaged thereby.

5. In apparatus for forming glass articles, the combination of a rotary support, a mold carried thereby, a downwardly swinging mold-bottom mounted on said rotary support, a pinion, a rack engaged with said pinion in rotation with said support, and connections between said pinion and said bottom for raising and lowering same.

6. In apparatus for forming glass articles, the combination of a rotary support, a mold carried thereby, a swinging mold-bottom mounted on said rotary support, a rock-shaft by which said bottom is carried, a pinion on said rock-shaft, a rack-bar engaging said pinion, and mechanism operated by the rotary movement of said support to operate said rack-bar to raise and lower said mold-bottom.

7. In apparatus for forming glass articles, the combination of a rotary support and mold carried thereby, a mold bottom, a rock shaft carrying said bottom, a pinion on said rock shaft, a horizontally movable rack bar engaging said pinion, a second pinion engaging said rack bar, a vertically movable rack bar engaging said second named pinion, a third pinion carried by said rotary support engaging said rack bar and a rack in the path of said last named pinion.

In testimony whereof, I the said LUIS W. PROEGER, have hereunto set my hand.

LUIS W. PROEGER.

Witnesses:
ROBERT C. TOTTEN,
JOHN F. WILL.